United States Patent
Richardson

[11] Patent Number: 6,003,746
[45] Date of Patent: Dec. 21, 1999

[54] FISHING ROD HOLDER

[76] Inventor: James O. Richardson, 1849 Arroyo Chamisa Rd., Santa Fe, N.Mex. 87505

[21] Appl. No.: 08/187,529

[22] Filed: Jan. 27, 1994

[51] Int. Cl.⁶ ................................................. A01K 97/10
[52] U.S. Cl. .................. 224/200; 224/162; 224/197; 224/661; 224/678; 224/245; 224/922; 43/21.2
[58] Field of Search .................. 224/149, 162, 224/195, 197, 200, 222, 224, 242, 245, 922, 192, 661, 678, 660; 43/21.2

[56] References Cited

U.S. PATENT DOCUMENTS

| | | | |
|---|---|---|---|
| 1,283,511 | 11/1918 | Heioltmann | 224/922 |
| 1,451,732 | 4/1923 | Hipwood | 224/200 |
| 1,761,497 | 6/1930 | Smith | 224/922 |
| 1,786,254 | 12/1930 | Meehan | 224/222 |
| 1,918,389 | 7/1933 | Gerline | 224/200 |
| 1,985,985 | 1/1935 | Gerline | 224/222 |
| 2,709,544 | 5/1955 | Barringer | 224/200 |
| 2,969,899 | 1/1961 | Brooks | 224/922 |
| 4,739,914 | 4/1988 | Pothetes | 224/253 |
| 4,802,612 | 2/1989 | Anderson | 224/208 |
| 4,828,154 | 5/1989 | Clifton, Jr. | 224/922 |
| 4,848,624 | 7/1989 | Clem | 224/222 |
| 4,876,980 | 10/1989 | Bell, III | 224/922 |
| 5,014,891 | 5/1991 | King | 224/200 |
| 5,123,578 | 6/1992 | Morse | 224/151 |
| 5,261,584 | 11/1993 | Albert | 224/197 |

Primary Examiner—Charles R. Eloshway
Attorney, Agent, or Firm—Rod D. Baker; Jeffrey D. Myers

[57] ABSTRACT

A body-mounted, strap-on fishing rod holder primarily designed for use by a disabled person who has the use of one arm. The invention includes a stabilized frame, attachable to the user's body, upon which is secured an adjustable rod-receiving element. The rod-receiving element is adjustable to any desired vertical angle, and the entire apparatus is easily reversible for right- or left-hand operation. The user can cast and reel in a fishing line with one hand while in a sitting or standing position.

14 Claims, 4 Drawing Sheets

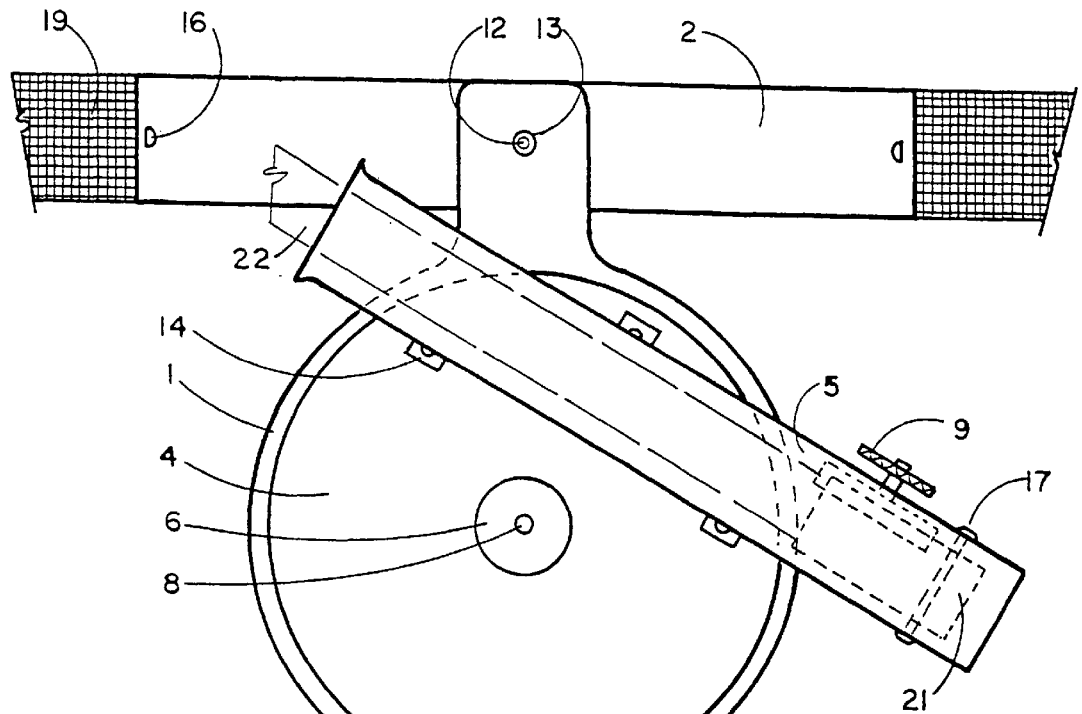
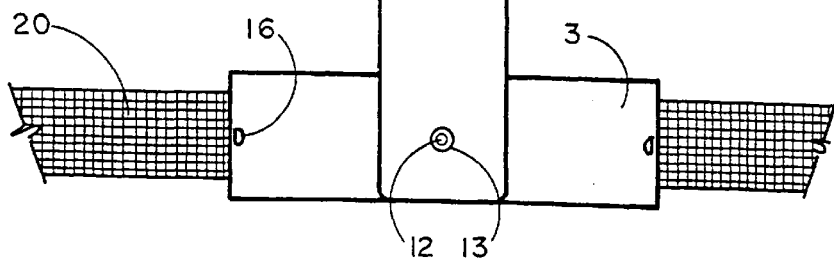
FIG. 1

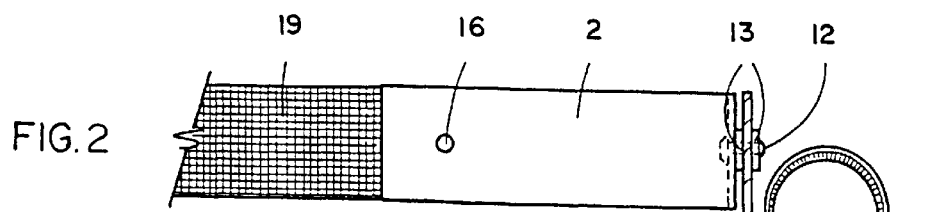
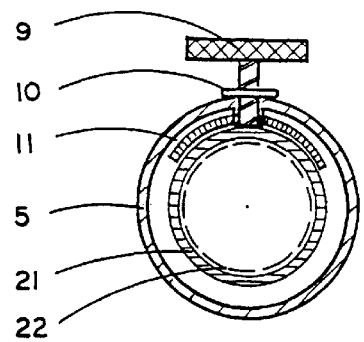
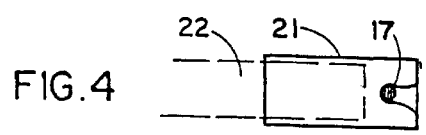
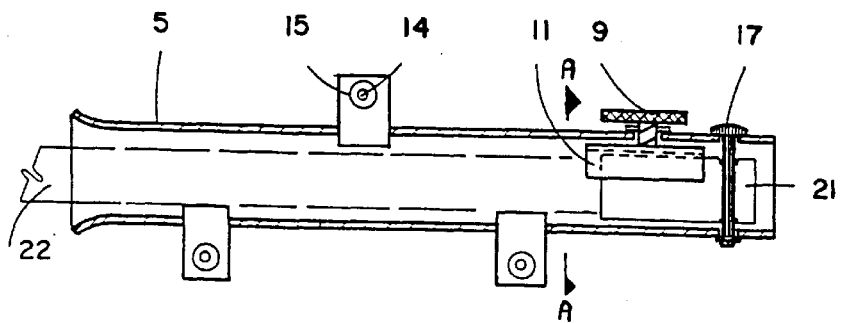
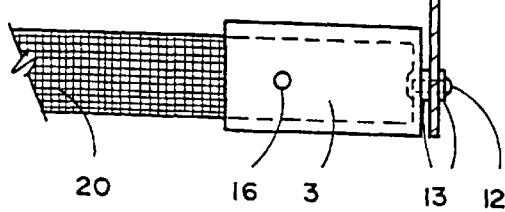

FISHING ROD HOLDER

BACKGROUND OF THE INVENTION

1. Field of the Invention (Technical Field)

This invention relates to an apparatus for holding a fishing rod.

2. Background Art

A number of attempts have been made to reduce the manual effort and physical dexterity required to hold and manipulate fishing rods. Sport fishermen continue to desire a means for holding their fishing rods which will reduce fatigue and allow freer use of the hands. Most previous efforts to address the need have involved apparatuses attached to the body by a single belt at the waist.

For example, U.S. Pat. No. 4,739,914 to Pothetes, entitled Holder for Supporting a Fishing Rod on the Body of a Person, discloses a belt-supported, side-mounted, double-jawed rod holder. Because the device is slip fit upon a single belt around the user's waist, it is somewhat unstable, especially while the user is reeling in the line.

U.S. Pat. No. 4,802,612 to Anderson, entitled Sporting Apparatus Support Device for the Handicapped, shows a front-mounted fishing rod holder attached to the user's body by straps around the upper body. No features for adjusting the fishing rod angle are taught.

U.S. Pat. No. 5,014,891 to King, entitled Fishing Aid, shows a front-mounted fishing rod holder secured by a single belt.

U.S. Pat. No. 5,123,578 to Morse, entitled Dual-Purpose Fishing Rod Holster, shows a side-mounted fishing rod holder supported by a single belt.

Despite the foregoing disclosures, a need remains for a fishing rod holder that is stable and secure during reeling, but which also offers the versatility of adjustability of rod angle and reversibility for either right or left hand use, and which is comfortable to wear and easy to use.

SUMMARY OF THE INVENTION
(DISCLOSURE OF THE INVENTION)

The invention relates to a fishing rod holder apparatus and method for its use. In the preferred embodiment, an upper stabilizer element and a lower stabilizer element are rotatably attached to a rigid frame. The frame is vertically fastened to the user's body by strapping the upper stabilizer and lower stabilizer to the user's waist and leg, respectively, with the stabilizers rotatable about generally horizontal axes.

Secured to the frame is a preferably tubular rod-receiving member, which receives the handle of the fishing rod. The rod-receiving member benefits from features permitting the adaptation of the apparatus of the invention to rod handles of assorted diameters, and also from elements for immobilizing the rod within the receiver.

The rod-receiving member is disposed upon a plate member parallelly and rotatably attached to the frame, so that the rod-receiving member (with fishing rod therein) may be rotated with respect to the frame. By this means, the vertical angle of the fishing rod can be adjusted to the user's liking. A clutch mechanism is provided for preventing the rotational movement of the rod-receiving member after the desired angle has been obtained.

The primary object of the present invention is to provide a means for holding a fishing rod while in use.

Another object of the present invention is to provide a means for holding a fishing rod that is easily used by a person having the use of only one arm.

A primary advantage of the present invention is that it holds a fishing rod, thus freeing the user's hands.

Another advantage of the invention is that it can be used by a person who has lost the use of one hand or arm.

Another advantage of the present invention is that it is versatile, in that it provides for adjustment of the fishing rod angle, and is reversible for use by either a right-handed person or a left-handed person.

Still another advantage of the present invention is that it is stable and secure in use, particularly while the user is reeling in the fishing line.

Still another advantage of the present invention is that it is comfortable, and does not place undue strain on the user's back and shoulders.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 1 is a side view of the preferred embodiment of the invention oriented for left-hand use;

FIG. 2 is a front view of the embodiment of FIG. 1;

FIG. 3 is a sectional side view of the tubular rod receiving element of the embodiment of FIG. 1;

FIG. 4 is a top view of the rod handle adapter element of the embodiment of FIG. 3, showing the rod holder pin engaged;

FIG. 5 is an end sectional view of the FIG. 3 embodiment, taken at line A—A on FIG. 3;

Figure 6:
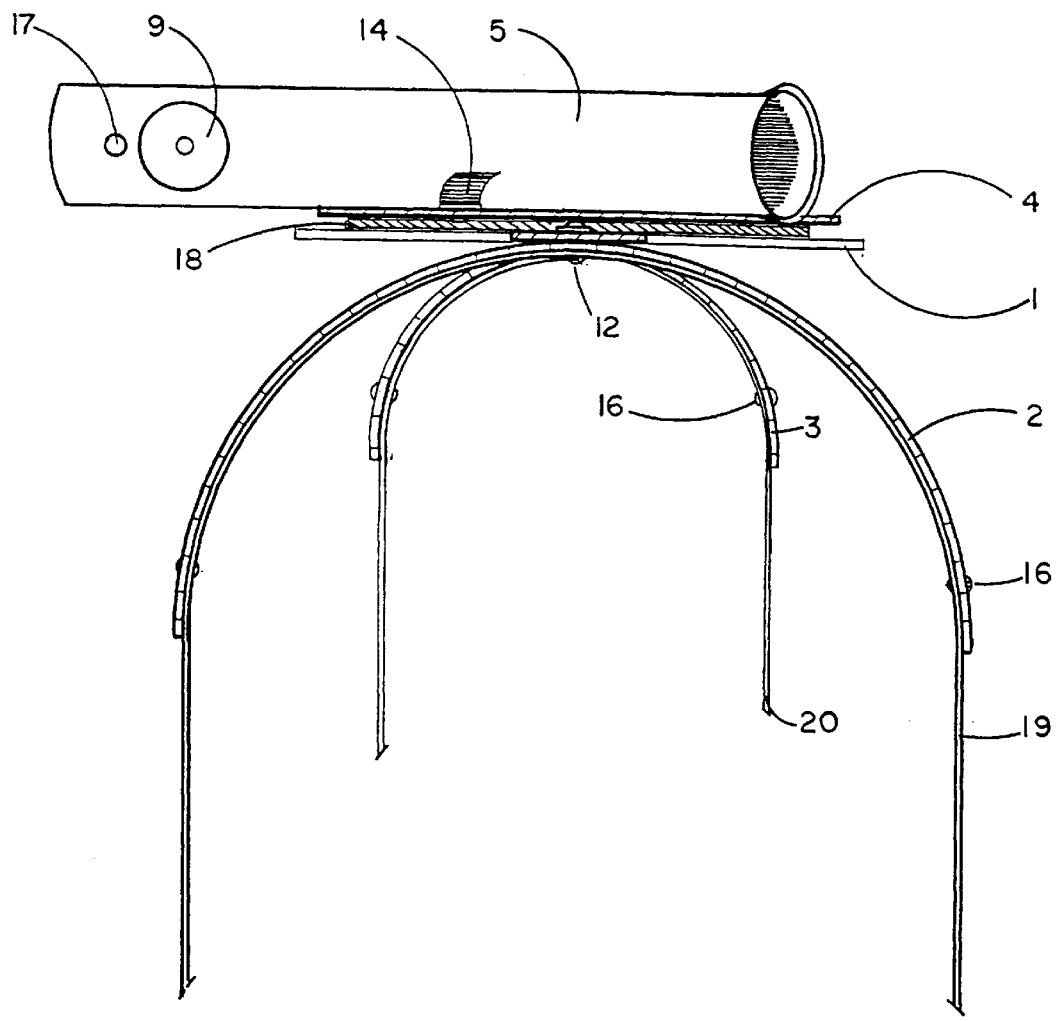
FIG. 6 is a top view of the embodiment of FIG. 1.

DESCRIPTION OF THE PREFERRED EMBODIMENTS (BEST MODES FOR CARRYING OUT THE INVENTION)

This invention relates to an apparatus, preferably to be worn on the user's body, for holding a fishing rod, and method for its use. Because it is adapted to one-handed practice, the invention finds particularly advantageous application in the case of handicapped users who have lost the use of an arm or hand. Nevertheless, the invention has practical application for all fishermen, because of its versatility and comfort while freeing the user's hands for baiting hooks, rigging tackle, tying knots, and the like.

The preferred embodiment of the invention is designed to be removably attached to the user's body, although alternative embodiments could be adapted for removable attachment to chairs or wheelchairs. Attachment is obtained with adjustable belts at the user's midsection (preferably at the waist) and leg (preferably just above the knee). This system of dual belts provides the apparatus with the stability required when reeling in the fishing line while the fishing rod is in the holder. Importantly, the stability of this holder allows reeling-in of the fishing line with only one hand.

The apparatus is adjustable to hold the rod at any vertical angle, and can be used while the user is in a sitting, standing, or walking position. The preferred embodiment of the apparatus also is reversible, such that a particular apparatus may be used by either a right- or left-handed user. The holder feature of the apparatus also may be used by any fisherman to store a disassembled or telescoping rod while walking or hiking.

FIGS. 1, 2, 6, and 7, collectively show that frame 1 of the preferred embodiment is removably attached to the user's body at the waist and above the knee by waist belt 19 and leg belt 20, which are comprised of leather, canvas, woven fabric strap or the like and are secured by hook-and-loop fabric fasteners (e.g. VELCRO®), buckles, or the like. Frame 1 is stabilized and prevented from twisting and turning by rigid U-shaped members, denoted as upper stabilizer 2 and lower stabilizer 3. Upper stabilizer 2 and lower stabilizer 3 conform to the shape of the corresponding portions of the user's body, and are attached to belts 19,20 using rivets 16 or the like. Stabilizers 2,3 are pivoted on a horizontal axis at each end of frame 1 as further explained hereafter.

Figure 7:
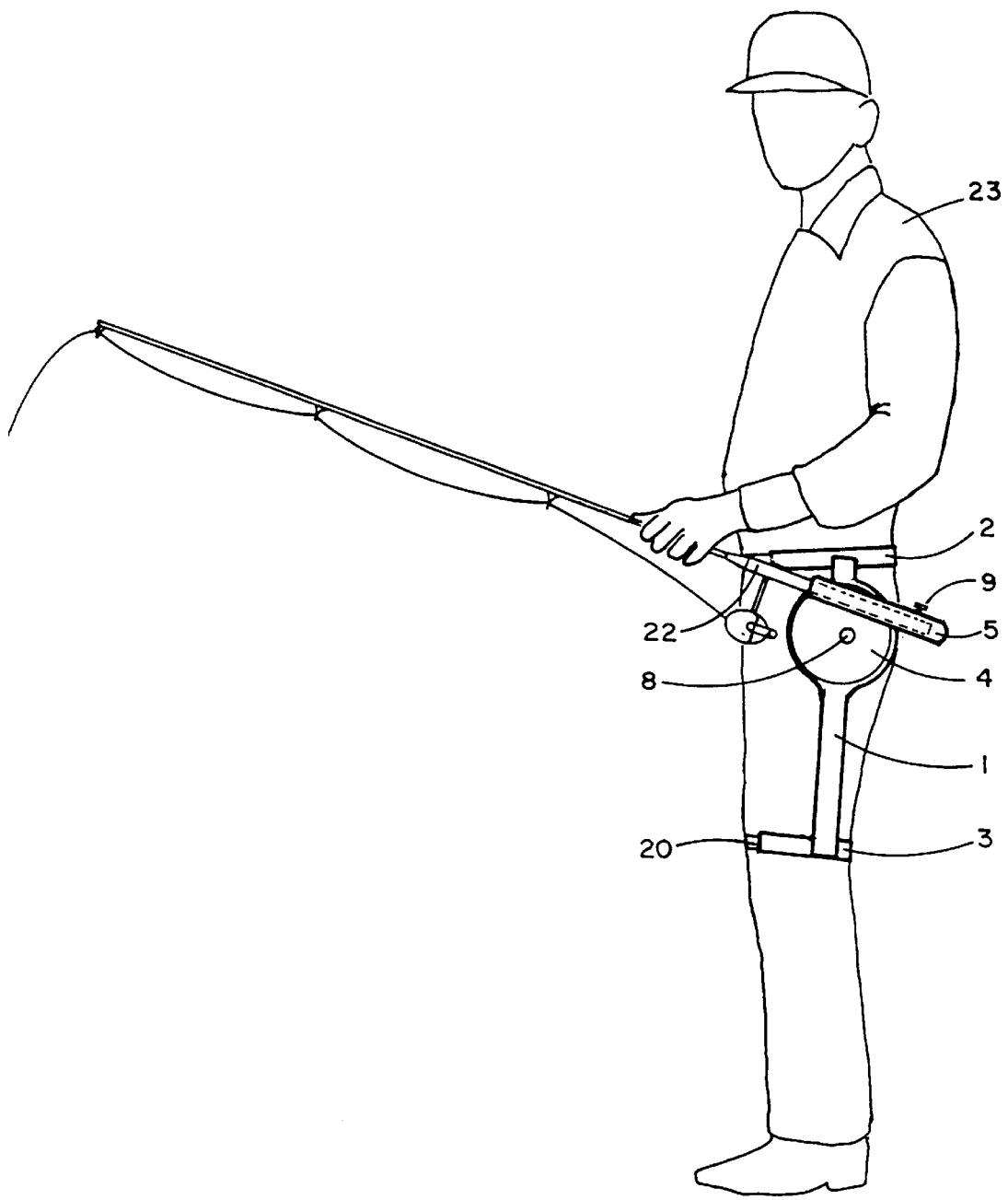
FIG. 7 shows a fisherman using the preferred embodiment of the invention in the left-handed position.

As shown in FIGS. 1, 2 and 7, tubular fishing rod receiver 5 is securely attached to a plate member, preferably a circular disc 4, which in turn is rotatably attached to frame 1. Rotatable attachment of disc 4 to frame 1 preferably is by bolt 8 and thumb nut 6, so that disc 4 may pivot on a horizontal axis, allowing adjustment of disc 4, and thus receiver 5 and fishing rod 22 to any angle desired. Disc 4 is associated with rubber (e.g., neoprene) disc 18, which serves as a clutch when tightened against frame 1 by the manual adjustment of thumb nut 6. Accordingly, thumb nut 6 may be loosened, receiver 5 and circular disc 4 adjusted to the desired position by the user, and thumb nut 6 re-tightened to clamp disc 4 in place, thus providing a means to hold rod 22 at the desired angle.

FIGS. 1 and 3–6 show that adjustment of thumb nut 9 on tubular rod receiver 5 secures the rod 22 in the receiver 5 as required. Rod 22 is further stabilized and prevented from turning or twisting within tubular receiver 5 by rod handle adapter 21. Various rod handle adapters 21 are configured in an assortment of sizes to adapt the use of the apparatus of the invention to the handle size of the particular rod in use.

As best shown in FIGS. 3–5, the butt end of the rod handle 22 is inserted into rod handle adapter 21 with a slot in adapter 21 in a vertical position relative to the position of the reel. When rod handle 22 is disposed within rod receiver 5, the vertical rod holder pin 17 in the lower end of the rod receiver 5 engages the slot in rod adapter 21, thus preventing rod 22 from rotating within receiver 5 when the fishing reel is cranked. To store a disassembled rod while hiking, tubular rod receiver S is raised to a vertical position to serve as a holster.

The preferred embodiment of the apparatus is reversible, for use on either the user's left or right side. To reverse the configuration of the apparatus for use on the opposite side, belts 19 and 20 are rotated 180°, and rod receiver 5 is rotated about bolt 8 to the desired angle.

FIG. 1 specifically illustrates a side view of the preferred embodiment of the apparatus of the invention. Fishing rod handle 22 is inserted into cylindrical rod handle adapter 21, which adapter 21 is supported within tubular receiver 5. Rod handle adapter 21 is retained within receiver 5 by the effect of thumb screw 9, and is restrained from rotating within receiver 5 by rod holder pin 17.

With combined reference to FIGS. 1–3, it is observed that tubular rod receiver 5 is attached to circular disc 4, preferably using rivets 14 with washers 15, although other equivalent attaching means suffice. Circular disc 4 is rotatably attached to vertical frame 1 by bolt 8 and thumb nut 6.

FIGS. 1, 2, 6, and 7, show upper stabilizer 2 and lower stabilizer 3 rotatably connected to vertical frame 1 using rivet pins 12 with washers 13. Rivet pins 12 are disposed through openings in frame 1 and washers 13, such that both upper stabilizer 2 and lower stabilizer 3 may be freely rotated about a horizontal axis defined by pins 12, but yet remain in sliding contact with frame 1. Upper waist belt 19 is attached to upper stabilizer 2 with rivets 16, and lower leg belt 20 is attached to lower stabilizer 3 with rivets 16. FIG. 2 specifically illustrates a front view of the preferred embodiment, further showing neoprene clutch disk 18 between circular plate 4 and main frame 1. FIG. 2 also shows additional detail of washer 7, rivets 12, and washers 13.

FIG. 3 and FIG. 5 show cross-sectional views of the rod receiver tube 5 with rod-retaining thumb screw 9. Thumb screw 9 screws through threaded fitting 10, which is disposed in wall of receiver 5. Manual manipulation of thumb screw 9 adjusts the pressure applied by friction member 11 against holding rod handle adapter 21. Friction member 11 is an arcuate section of a tube composed of, or lined with, a material having a high coefficient of friction, e.g., rubber. Adjustment of thumb screw 9, therefore, serves to secure or release rod 22 within receiver 5.

Reference to FIGS. 3 and 4 shows handle adapter 21 disposed about rod handle 22 and engaged with rod holder pin 17. Rod holder pin 17 secures adapter 21 within receiver 5.

FIG. 6 illustrates a top view of the preferred embodiment, showing that upper stabilizer 2 and lower stabilizer 3 are shaped to conform to the waist and leg area of the user, respectively.

Use of the preferred embodiment is generally depicted by FIG. 7. Frame 1 and its associated elements is strapped to the fisherman 23 at the waist and above the knee, using upper stabilizer 2 with waist belt 19 and lower stabilizer 3 with leg belt 20, respectively. Because frame 1 is attached to upper and lower stabilizers 2,3 using pivot pins 12, the positions of stabilizers 2,3 and frame 1, relative to one another, are adjustable and variable according to the user's movement and posture. Thumb nut 6 is loosened, allowing circular disc 4 to be rotated about bolt 8 until receiver 5 is at the desired comfortable angle. Thumb nut 6 is then tightened to cause adequate friction between disc 4 and frame 1 (via rubber disc 18) to secure disc 4 in position, thus exploiting the "clutch" feature of the invention. Rod handle 22 is snugly inserted into the adapter 21 located within receiver 5, and secured within receiver 5 by tightening thumb screw 9. The apparatus and fishing rod are then ready for use; while a one-handed user may require some assistance in placing the apparatus upon his body, he can operate the apparatus and fishing rod virtually without assistance.

The invention holds the fishing rod 22 securely, holds the rod 22 at any desired angle, provides stability for one-handed operation, stores the rod for transport, can be easily strapped on a person's body over bulky clothes, is easily and quickly converted for right- or left-hand use, and can be simply constructed of light weight materials such as plastic, aluminum, or the like.

Although the invention has been described in detail with particular reference to these preferred embodiments, other embodiments can achieve the same results. Variations in the invention may include shape, size and arrangement of parts but variations and modifications of the present invention will be obvious to those skilled in the art and it is intended to cover in the appended claims all such modifications and equivalents. The entire disclosures of all references, patents, and publications cited above, are hereby incorporated by reference.

What is claimed is:

1. A fishing rod holder apparatus comprising:
    a frame;
    an upper stabilizer rotatably disposed on said frame, said upper stabilizer comprising a rigid member conforming to a shape of a person's midsection and removably attachable to the person's midsection;
    a lower stabilizer rotatably disposed on said frame, said lower stabilizer comprising a rigid member conforming to a shape of the person's leg and removably attachable to the person's leg;
    means for removably attaching said upper stabilizer and said lower stabilizer to a person's body; and
    means for removably mounting the fishing rod upon said frame.

2. The apparatus of claim 1 wherein said means for removably attaching comprise at least one belt.

3. The apparatus of claim 1 wherein said means for removably mounting comprises:
    a rod receiver; and
    means for temporarily immobilizing the rod within said receiver.

4. The apparatus of claim 3 wherein said means for temporarily immobilizing comprises means for adapting an inner dimension of said rod receiver to an outer dimension of the rod.

5. The apparatus of claim 4 wherein said means for temporarily immobilizing further comprises:
    a friction member; and
    means for movably engaging said friction member against said means for adapting.

6. The apparatus of claim 5 wherein said means for movably engaging comprises a screw.

7. The apparatus of claim 4 wherein said means for temporarily immobilizing further comprises at least one pin disposed through said rod receiver and said means for adapting.

8. The apparatus of claim 1 further comprising means for adjusting a positional relationship between said frame and said means for removably mounting.

9. The apparatus of claim 8 wherein said means for adjusting comprises:
    a plate member disposed between said frame and said means for removably mounting;
    means for rotatably disposing said plate member on said frame; and
    means for controllably preventing the rotation of said plate with respect to said frame.

10. The apparatus of claim 9 wherein said means for rotatably disposing comprises a shaft bolt arrangement horizontally disposed through said frame and through said plate member.

11. The apparatus of claim 9 wherein said means for controllably preventing rotation comprises clutch means for varying friction between said plate member and said frame.

12. The apparatus of claim 11 wherein said clutch means for varying comprises an adjustable nut disposed upon said bolt.

13. The apparatus of claim 12 further comprising a frictional member disposed between said plate member and said frame.

14. The apparatus of claim 13 wherein said frictional member comprises an elastic disc disposed around said bolt.

* * * * *